United States Patent [19]

Ruehle

[11] 4,357,689

[45] Nov. 2, 1982

[54] SEISMIC DATA GATHERING METHOD

[75] Inventor: William H. Ruehle, Duncanville, Tex.

[73] Assignee: Mobil Oil Corporation, New York, N.Y.

[21] Appl. No.: 237,195

[22] Filed: Feb. 23, 1981

Related U.S. Application Data

[63] Continuation of Ser. No. 16,681, Mar. 1, 1979, abandoned, which is a continuation-in-part of Ser. No. 793,680, May 4, 1977, Pat. No. 4,146,870, which is a continuation-in-part of Ser. No. 709,486, Jul. 28, 1976, abandoned.

[51] Int. Cl.$^3$ .......................... G01V 1/38; G01V 1/02
[52] U.S. Cl. ........................ 367/23; 367/56; 367/61
[58] Field of Search ............... 367/15, 23, 48, 56, 367/61

[56] References Cited

U.S. PATENT DOCUMENTS

| | | | |
|---|---|---|---|
| 2,894,596 | 7/1959 | Fletow | 367/48 |
| 3,342,283 | 9/1967 | Pond | 367/61 |
| 3,346,068 | 10/1967 | Woods et al. | 367/48 |
| 3,368,191 | 2/1968 | McDonal | 367/23 |
| 3,479,638 | 11/1969 | Rusnek | 367/56 |
| 3,491,848 | 1/1976 | Giles | 367/23 |
| 3,687,218 | 9/1972 | Ritter | 367/23 |
| 3,744,021 | 7/1973 | Todd | 367/56 |
| 3,953,826 | 4/1976 | Brundrit | 367/23 |
| 4,064,479 | 12/1977 | Ruehle | 367/15 |
| 4,170,002 | 10/1979 | Strange | 367/23 |

*Primary Examiner*—Nelson Moskowitz
*Attorney, Agent, or Firm*—Charles A. Huggett; Michael G. Gilman; James F. Powers, Jr.

[57] ABSTRACT

This specification discloses a method of seismic exploration and in particular a method of generating and gathering field seismic data. Paths or seismic lines are traversed across the earth or water layers overlying the earth and over subsurface earth formations thereunder, and seismic energy is generated and transmitted into the earth and a portion thereof is reflected from the subsurface formations back toward the surface of the earth where the reflected seismic energy is detected and recorded. In conducting the seismic survey, a long linear array of seismic sources is simultaneously activated to produce a seismic pulse that is focused essentially vertically into the earth, and seismic energy is reflected from subsurface formations thereof and is detected by a long array of seismic detectors and is recorded. At a separate but closely related time, the long linear array of seismic sources is activated, beginning at the end thereof farthest from the detectors and proceeding to the other end thereof with a preselected time delay between the activation of each next succeeding source to produce a seismic pulse which is focused downwardly into the earth at a designed angle with the vertical. At a still separate but closely related time, a point seismic source is activated to produce a nonfocused seismic pulse which is transmitted into the earth, and reflections from subsurface earth formations therefrom are recorded. The above-described operations are repeated at other locations or shotpoints in traversing the seismic lines, and seismic data are gathered from the earth's subsurface formations.

7 Claims, 3 Drawing Figures

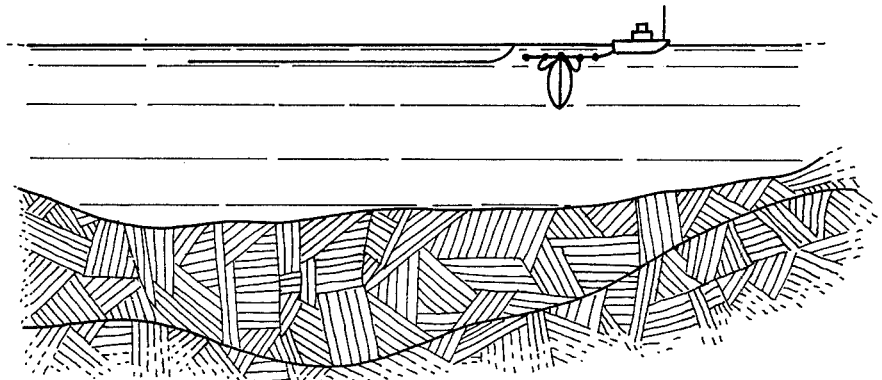
FIG. IA
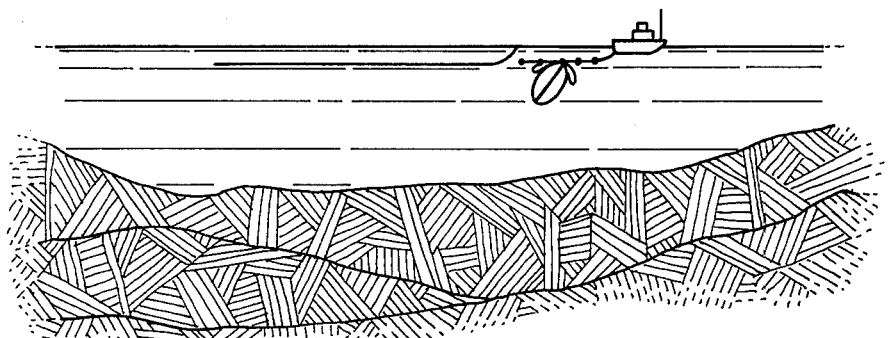
FIG. IB
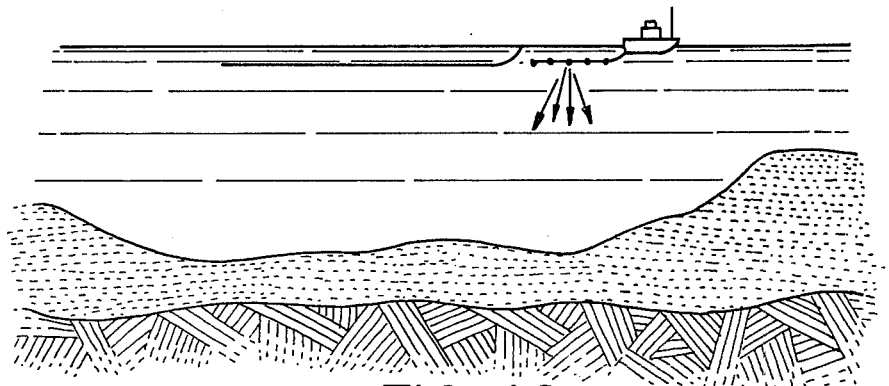
FIG. IC

SEISMIC DATA GATHERING METHOD

This is a continuation of application Ser. No. 16,681, filed Mar. 1, 1979 now abandoned which was a continuation-in-part of application Ser. No. 793,680, filed May 4, 1977, now U.S. Pat. No. 4,146,870, issued Mar. 27, 1979, which was a continuation-in-part of Ser. No. 709,486, filed July 28, 1976, now abandoned.

BACKGROUND OF THE INVENTION

This invention is related to seismic exploration and more particularly is directed to a method of carrying out a seismic survey to gather seismic data obtained from the field.

In conducting a field seismic survey, a seismic energy source is employed to generate a seismic signal, also referred to as a seismic pressure wave, which is transmitted into the earth. A portion of this signal is reflected from reflecting interfaces within the earth back toward the surface of the earth where it is received by detector stations positioned to receive the reflected signals. Reflecting interfaces occur in the earth where there are changes in the density and acoustic velocity of the earth material. Reflecting interfaces generally occur essentially at the tops and bottoms of subsurface formations, and it is commonly said that seismic energy is reflected from subsurface formations. The detector stations are usually comprised of a group of geophones which generate electrical signals in response to received seismic signals. The geophones are electrically connected with seismic recording instruments for recording the electrical signals. A recording of one seismic channel is referred to as a trace or seismic trace. When the trace is recorded in analog form on a magnetic tape, there is a continuous record written on the tape of an output voltage of a seismic amplifier used in conjunction with the recording of the electrical signals generated by the geophones. When processed in analog form, these electrical signals are operated upon, for example, by filtering, to present them in form for use by geophysicists. With the advent of digital recording of seismic data, a discontinuous record of the signal is written that measures the seismic amplifier output voltage only at discrete intervals. The digitally recorded data may be operated upon to present the data in form for use by geophysicists. The recording of the seismic energy is commonly displayed as a seismogram having a plurality of traces thereon and having a means superimposed thereon for timing the recorded events. The recorded event of energy reflected from a reflecting interface, hereafter referred to as from a subsurface formation, is commonly referred to as a reflection.

There are many different types of seismic energy sources employed in seismic exploration. One such source suitable for use in marine exploration is described in U.S. Pat. No. 3,506,085 to George B. Loper. A long array of seismic sources suitable for use in marine seismic exploration is described in U.S. Pat. No. 4,134,098 to William H. Ruehle. In U.S. Pat. No. 3,491,848 to Ben F. Giles there is described a marine method of seismic exploration wherein an array of seismic wave sources is streamed behind a marine vessel in a horizontal array such that horizontally traveling components of generated seismic wave trains will be out of phase with one another and thus the horizontal components of the generated seismic wave trains will be canceled. The seismic wave sources are also streamed at depths proportional to the fundamental frequency of the generated seismic waves and are fired at different times such that vertically traveling components of the generated wave trains interact with one another in accordance with desired operating conditions. In U.S. Pat. No. 3,953,826 to Dennis R. Brundrit et al. there is described an elongated seismic source for use in marine seismic exploration, which source consists of individual seismic sources with one or more sources being grouped in an array. Brundrit et al. teach that the shock wave generated by the elongated seismic source may be directed in a direction other than the vertical by firing the array consecutively in one direction along the elongated seismic source with a certain delay time between consecutive firings. The delay time may be up to about 100 milliseconds, or greater.

In U.S. Pat. No. 4,064,479 to William H. Ruehle there is described a system for marine seismic exploration that has arrays of sources and receivers which discriminate against horizontally traveling source-generated noise. In U.S. Pat. No. 4,101, 866 to William H. Ruehle there is described a detector spread for marine seismic exploration that has arrays with lengths which are dependent upon the acoustic velocity and dip of the subsurface formations being explored, upon the offset distance from the seismic source to the array, and upon the reflection time of reflections from formations of interest.

In U.S. Pat. No. 4,134,098 to William H. Ruehle there is described a long array of sources for use in marine seismic exploration, the length of which array may be changed in accordance with the geological characteristics of subsurface formations being explored and with the reflection time of reflections from formations of interest.

In U.S. Pat. No. 3,346,068 to John P. Woods et al. there is described a method of improving seismic exploration by focusing generated seismic waves into a directional beam and focusing the receiving system's response pattern into a directional beam. The seismic energy is focused into a directional beam by actuating various sources of energy in a sequential manner to produce a directional plane wave front.

SHORT DESCRIPTION OF THE DRAWINGS

FIGS. 1A-1C show a linear array of seismic sources and a linear array of seismic detectors being towed over subsurface formations with the drawings respectively showing the linear array of seismic sources being activated simultaneously, being activated sequentially with a preselected time delay to affect a tilted seismic source, and being activated as a point seismic source.

SUMMARY OF THE INVENTION

This invention is directed to a method of seismic exploration wherein a seismic line across the earth's surface is traversed. A linear array of seismic sources and a linear array of seismic detectors in spaced relationship therewith are positioned over the subsurface formations. The linear array of seismic sources is activated simultaneously to produce seismic energy in the form of a seismic pressure wave that is focused essentially vertically downward into the earth. The linear array of seismic sources is again activated, this time sequentially beginning at a selected end thereof and proceeding to the next adjacent source with a preselected time delay to effect a tilted seismic source and produce seismic energy in the form of a seismic pressure pulse that is focused downwardly into the earth at a designed angle with the vertical. A point seismic source is then activated to produce nonfocused seismic energy that is transmitted downwardly into the earth. The seismic energy that is transmitted into the earth is reflected by subsurface formations thereof toward the surface and is received by the seismic detectors. Signals are produced thereby representative of the reflected energy, and the signals are recorded. These activations of the seismic sources are repeated at spaced points along the seismic line.

DESCRIPTION OF THE PREFERRED EMBODIMENTS

This invention is directed to a method of seismic exploration and more particularly to a method of conducting a seismic survey to gather seismic data.

In a copending application, Ser. No. 793,680, SEISMIC EXPLORATION FOR DIPPING FORMATIONS, to William H. Ruehle, filed May 4, 1977, now U.S. Pat. No. 4,146,870 there is described a seismic exploration method for enhancing seismic reflection signals from a dipping formation by controlling the directivity of an array of marine seismic sources so that energy from the sources reflects from the dipping formation approximately vertically and intersects an array of hydrophones orthogonally. In the method there described, a linear horizontal array of seismic sources is towed behind a vessel and a horizontal array of acoustic receivers is also towed behind the vessel at a greater distance than the sources. The seismic sources are fired simultaneously to produce a seismic pressure wave which is transmitted through the water layer and into the earth and reflected therefrom and received by the acoustic receivers which generate electrical signals in response to the signal received by the acoustic receivers, which electrical signal is conducted to recording equipment and recorded. A second traverse of the seismic exploration line is made, and values of dip and acoustic velocity determined during the first traverse are used to control the sequential firing of the array of seismic sources so that the resultant seismic pressure wave is directed into the water at a directivity angle $\theta$ which is twice the angle of dip determined during the first traverse. This exploration method may be carried out in a single traverse of the line by alternating the firings of the sources between the simultaneous firing and the sequential firing.

The equipment used in carrying out the invention of the above-described copending application is suitable for use in carrying out the present invention. Another linear horizontal array of seismic sources, referred to as a long source array, which is suitable for carrying out the present invention is described in the aforementioned U.S. Pat. No. 4,134,098.

In conducting a seismic survey the most practical way from the field operation standpoint is to lay out the seismic lines such that they may be traversed in the shortest length of time regardless of the dips of subsurface formations. The present invention provides a method of conducting the seismic survey using long source arrays in conjunction with horizontal detector arrays whereby seismic lines are traversed in gathering seismic data without regard to the dip of the underlying formations.

The present invention is applicable for conducting both land and marine seismic surveys but, for simplicity of description, will be described with reference only to conducting a marine seismic survey.

In accordance with the present invention, a seismic line or line of exploration is traversed by a boat towing a long seismic source array (a linear horizontal array of seismic sources) therebehind, as described in the aforementioned U.S. Pat. No. 4,134,098, and a streamer containing a plurality of seismic detectors which are also referred to as receivers and hydrophones (array of seismic detectors) which extend much beyond the long seismic source. The long source array contains individual seismic sources spaced apart one from the other, which individual seismic sources may be fired simultaneously or sequentially with time delays between the firing of each next succeeding source. In addition, the long source array should be adapted for firing a single source or small group of sources as a point seismic source, or else a separate seismic source should be towed behind the seismic boat for firing as a point source. In traversing the seismic line, seismic data are gathered by three cycles or modes of operation.

First, a long seismic source is activated or fired simultaneously to produce a seismic pressure wave that is focused essentially vertically downward through the water into the earth whereby the seismic wave reflects from the sursurface formations and travels toward the water surface. Second, the long seismic source is activated or fired sequentially beginning at the end thereof most distant from the array of seismic detectors and proceeding to each next adjacent source with a preselected source time delay to produce a seismic pressure wave that is focused downward through the water and into the earth at a designed angle with the vertical whereby the seismic wave reflects from the subsurface formations and travels toward the water surface. Third, at least one seismic source is activated or fired to effect a point seismic source to produce a nonfocused seismic pressure wave that travels downward through the water and into the earth whereby the seismic wave reflects from the subsurface formations and travels toward the water surface. The reflective waves from each of these three cycles of operation are detected and recorded. These three cycles of operation are repeated at spaced points along the line of exploration as the boat traverses the line, one cycle following very closely after the other, and in any order desired, thus resulting in three sets of data being obtained for each traverse of a line. These three sets of data may be displayed as separate sets of data or combined into a single set of data as desired.

The data obtained may be displayed as three sets of data and in which case the data resulting from the firing of the point seismic source will display shallow reflections with much less distortion than that produced by the long source array. This can be visualized by thinking of a single hydrophone receiving reflective energy from a subsurface formation produced first from a point seismic source and secondly from a plurality of spaced-apart seismic sources as is present in the long source array. The energy striking the hydrophone produced by the single source can be thought of as striking a point with a single tooth of a comb and producing a single signal, as contrasted to the energy striking the hydrophone produced by the long source array which can be thought of as striking the point sequentially with a plurality of comb teeth and producing a plurality of signals, one for each time the point is struck by a comb tooth. This effect is much more pronounced in reflections received from shallow formations, as contrasted to reflections received from deep formations, and thus the primary usefulness of the data resulting from the firing of the point seismic source is for interpretation of the shallow formations.

The data resulting from the simultaneous firing of the long source array produce optimum data when the source array is located updip of the streamer of hydrophones. The data resulting from the sequential firing of the long source array beginning at the end of the source array most distant from the streamer of hydrophones and proceeding with delays between each firing towards the streamer produce optimum data from formations which dip in the opposite direction, that is, which dip downward from the streamer toward the source array.

Thus, in the conducting of a seismic survey in accordance with the present invention, optimum seismic data may be obtained regardless of the depth of the subsurface formations or the direction of the traverse of the seismic lines with respect to the dip of the subsurface formations.

This invention has been described with respect to obtaining three separate sets of seismic data which may then be used separately and in combination by geophysicists to gain knowledge of the subsurface formations of the earth. If desired, any two sets of the data or all three sets of the data may be combined into a single set of data.

As discussed above, in conducting seismic surveys using long seismic source arrays and long detector arrays, otpimum data are obtained when traversing a seismic line having the source array updip of the detector array by simultaneously firing the source array (source array has no tilt). When traversing a seismic line having the source array downdip of the detector array, optimum data are obtained by sequentially firing the source array with delays between each firing, beginning at the source most distant from the detector array and progressing toward the detector array with detectors selected to produce an effective tilt of the source of twice the apparent reflection dip as observed at the surface.

In conducting seismic surveys, the exact dips of subsurface formations are not known beforehand but a range of dips to be expected can be determined or estimated from, for example, known subsurface information or other seismic surveys. Further, as previously discussed, it is desirable to lay out and traverse seismic lines along the surface of the earth without regard to directions dictated by the subsurface formations. Further, at different depths within the earth section, the magnitude of the dips of subsurface formations and even the direction of dips of the formations may vary. For these reasons, the present invention provides a very good technique for gathering seismic data. When traversing a line with the seismic source updip of the detector array, the simultaneous firing of the source array produces the best data. At the same time, however, the firing of the tilted source tends to improve the data in those formations where the dip thereof is reverse to the primary dip. In traversing a long seismic line it is quite common for both the magnitude and direction of dip of subsurface formations to vary as also occurs in crossing a structure in a subsurface formation. Thus, the present invention provides a technique which can be routinely carried out in the field and which will result in gathering optimum seismic data without regard to changes in the dip of subsurface formations lying below the seismic line being traversed.

The source length and source tilt may be designed for gathering optimum data by estimating the highest and lowest dip value expected. The source tilt is then set at the mean of these two angles, with the high dip set to the upper half power point in the dip band width and the low dip set to the lower half power in the dip band width. The dip band width determines the source length. Equations relating the source tilt and length to dip are given below:

$$L = K \frac{V_w T}{\sin\delta}, \text{ source length} \quad (1)$$

$$\Delta T = \frac{L}{N} \frac{\sin 2\theta}{V_w}, \text{ source delays} \quad (2)$$

$$\theta = \frac{\alpha_1 + \alpha_2}{2}, \text{ rotation of response lobe from vertical} \quad (3)$$

$$\delta = \frac{\alpha_2 - \alpha_1}{2}, \text{ half width of response lobe} \quad (4)$$

where,
$\Delta T$ = source time delay, milliseconds
$T$ = predominant reflection period,
$V_w$ = surface layer velocity,
$L$ = source length,
$\alpha_1$ = lowest dip,
$\alpha_2$ = highest dip,
$K \approx 0.46$, ($\Delta T/T$) value for half power response of source array, and
$N$ = number of sources in source array.

I claim:

1. In seismic exploration, a method of obtaining optimum seismograms when traversing a seismic line regardless of the dip of the subsurface formations with respect to the direction of said line comprising:
    traversing said line with a linear array of seismic sources and a linear array of seismic detectors spaced along said line from said sources;
    activating said linear array of seismic sources simultaneously to produce a seismic wave that travels substantially vertically into the earth;
    recording signals representative of the vertical traveling seismic energy reflected from said subsurface formations and detected by said detectors to produce optimum traces of reflections from formations which dip upwardly from said detectors toward said sources;
    activating said linear array of seismic sources sequentially beginning at the source most distant from the detector array and progressing toward the detector array with preselected delays between each firing to effect a tilted seismic source and produce a seismic wave that travels at an angle with the vertical;
    recording signals representative of the aforesaid seismic energy traveling at an angle, reflected from said subsurface formations, and detected by said detectors to produce optimum traces of reflections from formations which dip downward from said detectors toward said sources;
    repeating said activating steps at spaced points along said seismic line; and
    combining said traces to produce optimum seismograms representing both of the aforesaid types of formations.

2. The method of claim 1 further comprising:

activating a point seismic source to produce nonfocused seismic energy that is transmitted downwardly into the earth, and recording signals produced by said seismic detectors that are representative of the reflected seismic energy from said subsurface formations.

3. The method of claim 1 wherein said seismic exploration is a marine seismic exploration in which a boat traverses a line of exploration over subsurface formations and tows a linear array of seismic sources and an array of seismic detectors in spaced relationship with said linear array of seismic sources along said line of exploration over said subsurface formmatons.

4. The method of claim 3 further comprising activating a point seismic source to produce a nonfocused seismic pressure wave that travels downward through the water and into the earth whereby said seismic wave reflects from the subsurface formations and travels toward the water surface.

5. The method of claim 1 further comprising determining the highest and lowest dip of said subsurface formations and firing said linear array of seismic sources with a delay defined by the following equation:

$$\Delta T = \frac{L}{N} \frac{\sin 2\theta}{V_w}$$

where, $\Delta T$ = source time delay, milliseconds,
L = source length,
N = number of spaces between the sources of the linear array of seismic sources,
$V_w$ = surface layer velocity, and
$\theta$ = mean of the highest and lowest subsurface formation dip.

6. The method of claim 5 wherein the length of said linear array of seismic sources is designed as indicated below:

$$L = K \frac{V_w T}{\sin \delta}$$

$K \approx 0.46$, ($\Delta T/T$) value for half power response of source array,
$V_w$ = surface layer velocity,
T = predominant reflection period,
$\delta = (\alpha_2 - \alpha_1)/2$, half width of response lobe,
$\alpha_1$ = lowest dip of subsurface formation, and
$\alpha_2$ highest dip of subsurface formation.

7. The method of claim 3 wherein a determination is made of the highest and lowest dip of the subsurface formation and wherein the length of the linear array of seismic sources and the preselected source time delay are determined by the equation below:

$$L = \frac{V_w T}{\sin \delta}$$

$$\Delta T = \frac{L}{N} \frac{\sin 2\theta}{V_w}$$

where:

L = source length,
$K \approx 0.46$, ($\Delta T/T$) value for half power response of source array,
$V_w$ = surface layer velocity,
T = predominant reflection period,
$\delta = (\alpha_2 - \alpha_1)/2$, half width of response lobe,
$\Delta T$ = source time delay, milliseconds,
N = number of spaces between the sources of the linear array of seismic sources, and
$\theta$ = mean of the highest and lowest subsurface formation dip.

* * * * *

UNITED STATES PATENT AND TRADEMARK OFFICE
CERTIFICATE OF CORRECTION

PATENT NO. : 4,357,689
DATED : November 2, 1982
INVENTOR(S) : WILLIAM H. RUEHLE

It is certified that error appears in the above-identified patent and that said Letters Patent are hereby corrected as shown below:

Col. 5, line 30, "otpimum" should be --optimum--.

Col. 7, line 14, "formmations" should be --formations--.

Col. 8, line 14, insert an --=-- between "$a_2$" and "highest".

Col. 8, line 22, the equation should read:

$$L = K \frac{VwT}{\sin \delta}$$

Signed and Sealed this

Seventeenth Day of July 1984

[SEAL]

Attest:

Attesting Officer

GERALD J. MOSSINGHOFF
Commissioner of Patents and Trademarks